Aug. 18, 1931.     M. L. OSBORN     1,819,438
COTTON PICKING AND GATHERING MACHINE
Filed Oct. 25, 1929     4 Sheets-Sheet 1
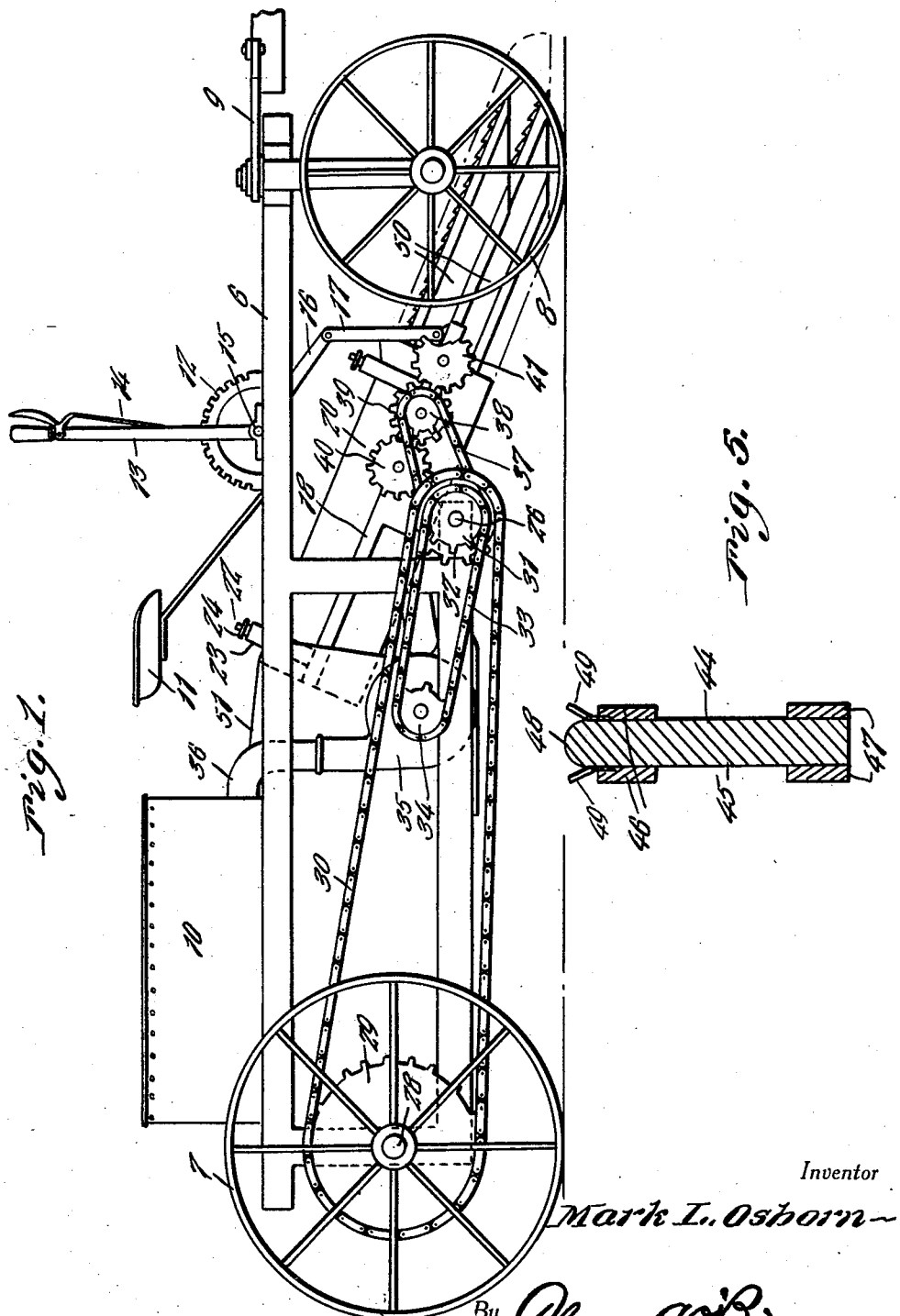
Inventor
*Mark L. Osborn*
By *Clarence A. O'Brien*
Attorney

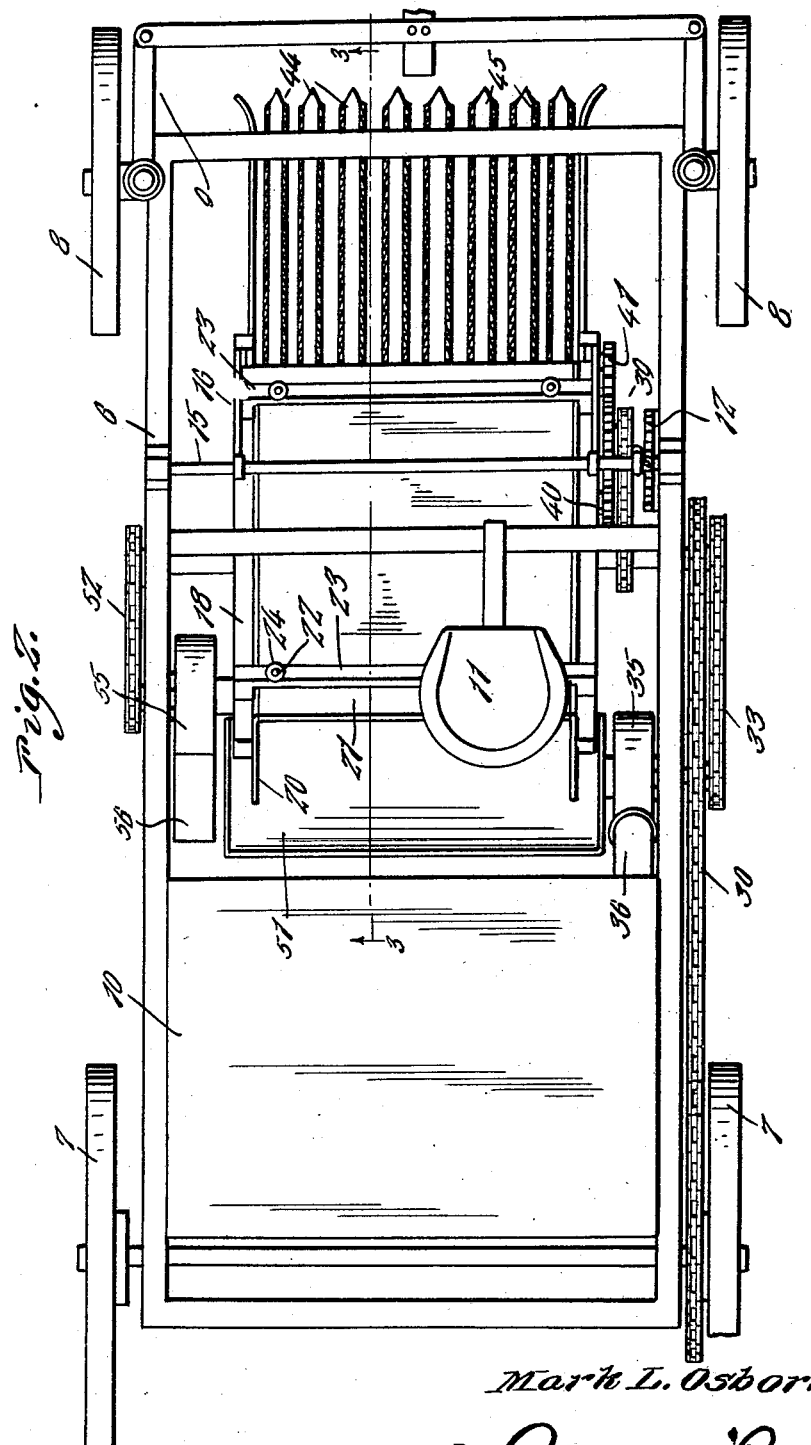

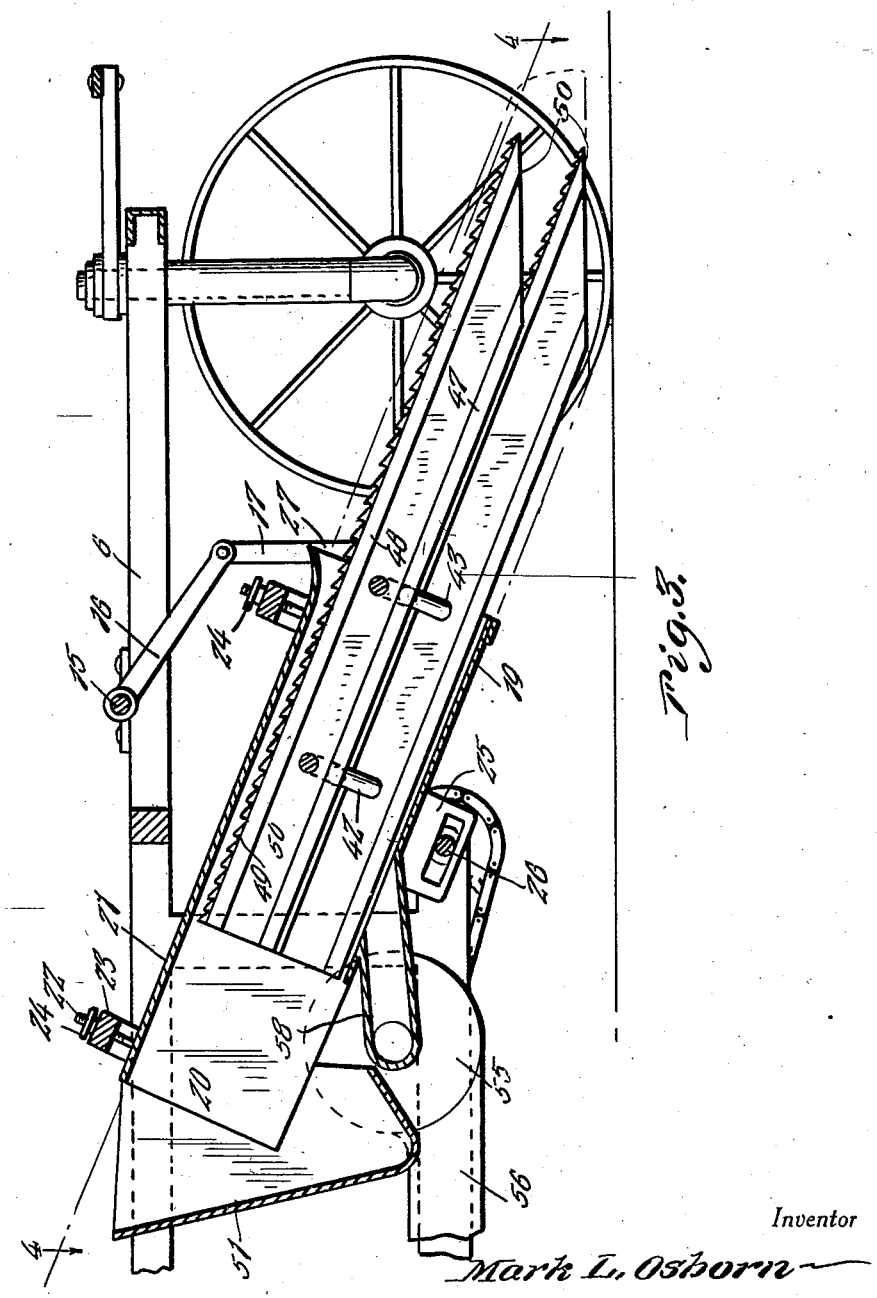

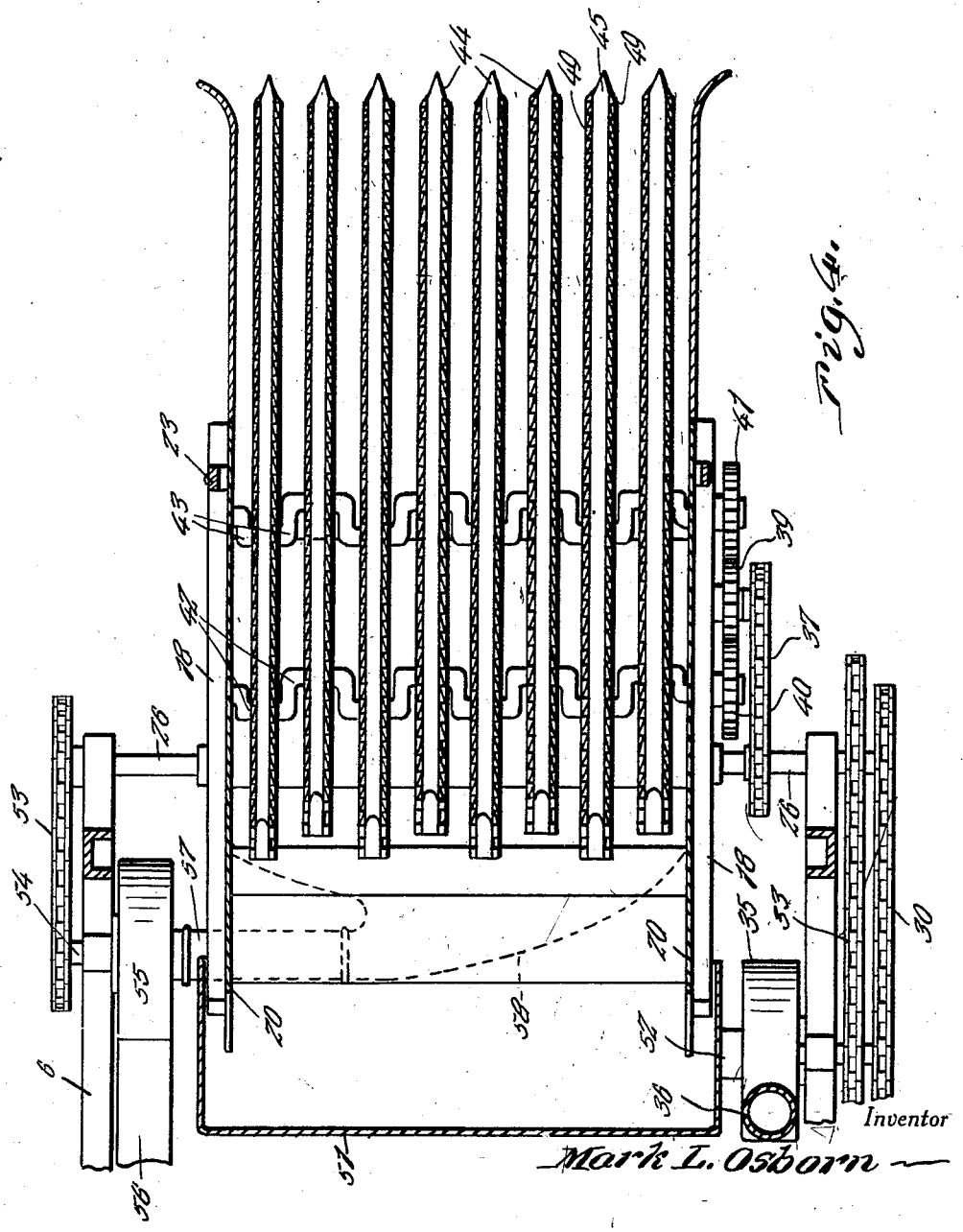

Patented Aug. 18, 1931

1,819,438

UNITED STATES PATENT OFFICE

MARK L. OSBORN, OF ELIDA, NEW MEXICO

COTTON PICKING AND GATHERING MACHINE

Application filed October 25, 1929. Serial No. 402,503.

This invention relates to an improved machine for use in cotton fields and constructed for picking the cotton from the plant, for gathering the picked cotton and conveying it into a collector, and subsequently removing it from the collector and storing it in a suitable container for periodical removal.

It is a matter of common knowledge that cotton has heretofore been more successfully removed from the vine and plants by hand picking methods, under which conditions, the picker removes the cotton from the boll and places it in a gathering sack or other similar receptacle for subsequent collection.

This method of picking is of course practical but quite laborious and time consuming since it requires many hands and is consequently expensive as well as slow.

Under the present hand picking method, the rows of plants are continuously traversed by the pickers and the ripe cotton picked and the unripened cotton allowed to remain on the plants for picking when the same row is again traversed at an appropriate interval of time.

From experience, I have found that this staggered method of picking is not essential, for after the frost acts upon the bolls, they are automatically opened. Consequently, at a predetermined season of the year, it is possible to practically strip all cotton from the plants, thus making it possible to gather the cotton at a single time.

With the foregoing in mind, I have therefore found it practicable to develop a mechanical machine to take the place of the present hand picking method, said machine being appropriately constructed to permit severing of the cotton, with or without the bolls, gathering of the bolls and cotton, separating of the cotton from the bolls, and discharging the separated bolls on the ground and simultaneously storing the cotton in an appropriate collecting container.

In developing and constructing this improved cotton harvesting machine, I have found it expedient to employ a wheel supported conveyance or frame made to straddle the row of plants, and drawn along the row by appropriate draft means. The improved means and mechanism for harvesting the cotton is adjustably suspended on this frame in a position to force its way into the plant in a manner to sever and strip the cotton with or without the bolls for accomplishing the diversified results stated.

The improved structural organization of parts employed for constructing a machine of this type, will become more readily apparent from the following description and drawings.

In the drawings:—

Figure 1 is a side elevational view of the complete machine, as constructed in accordance with the present invention.

Fig. 2 is a top plan view of the same.

Fig. 3 is an enlarged fragmentary sectional and elevational view taken approximately upon the plane of the line 3—3 of Fig. 2.

Fig. 4 is a horizontal sectional view taken on the plane of the line 4—4 of Fig. 3, and Fig. 5 is a cross section through one of the reciprocatory pickers.

As seen in the complete arrangement in Fig. 1, the reference character 6 designates the frame of the conveyance. This may be of any appropriate construction and configuration. It has been found practical to construct the frame so that it will straddle the row and to provide it with appropriate wheels, the rear wheels being designated at 7 and the front wheels as at 8. The numeral 9 designates generally the draft lever or hitch device. Incidentally, the conveyance may be horse drawn or propelled by a tractor, motor or the like.

On this frame, at any suitable point and constructed in any appropriate way is a receiver or container 10 for the cotton. Also a convenient seat for the operator indicated at 11, is also provided. The reference numeral 12 designates a toothed segment and 13 a complemental lever carrying a retaining pawl 14 for engagement with the rack. The lever is mounted on a rock shaft, 15 provided with one or more rocker arms 16 carrying depending lifting links 17 which serve in a manner to be hereinafter described.

The principal part of the harvesting mechanism is the means employed for engaging the plant and severing, stripping, or picking the cotton therefrom. This means, broadly conceived, permits continuously operable devices acting on the cotton in rapid succession.

Means embody a suitably constructed frame 18 having a housing attached thereto. The housing comprises a bottom wall 19 as seen in Fig. 3 and spaced parallel side walls 20. Fitted between the side walls is a cover plate 21 having upstanding screw threaded studs 22 passing through the bight portion of longitudinally spaced arches 23 mounted on the frame. The threaded ends of the studs are equipped with adjusting nuts 24 by means of which the plate is raised and lowered with respect to the housing. The housing and frame include depending slotted brackets 25 rockably mounted on the transversely disposed rotatable shafts 26.

Incidentally, the intake end of the cover plate is flared upwardly and outwardly as at 27. It might also be stated that the cover plate is primarily a crushing plate for the hulls or sections of the bolls which are drawn into the housing and the crushing action may be varied by the adjusting bolts and nuts just described.

Furthermore, the shaft 26 will be hereinafter referred to as the propeller shaft for the harvesting mechanism. The rear axle 28 is equipped on one end with a sprocket wheel 29 over which the main power propulsion chain 30 is trained. The opposite end of the chain is trained over a relatively large sprocket wheel 32 carried by the propeller shaft 26. This propeller shaft is also provided with a slightly smaller sprocket wheel 31 over which the separate chain 33 is trained and the chain 33 drives a sprocket 34 carried by a fan shaft in the suction fan housing 35.

As shown in Fig. 1, the suction fan has its outlet joined to the collection box 36 by way of an appropriate pipe.

A third sprocket chain 37 takes its power from the shaft 26 and transmits to a small sprocket carried by a rotatably mounted gear 39. This gear imparts rotation to companion pinions or gears 40 and 41 which drive a pair of spaced parallel crank shafts 42 and 43 respectively (see Fig. 3). The crank shafts are journaled for rotation in appropriate bearings in the aforesaid housing.

The crank shafts serve to impart intermittent reciprocation and rotation to a gang or assembly of pickers. Each picker is the same in construction, and a description of one will suffice for all. It will be noted that they are arranged in longitudinal spaced parallelism in alternating pairs. In fact, in the drawings I have shown eight of these picking devices and they operate in these alternating pairs.

Each device is constructed as seen in Fig. 5, wherein the device is generally designated by the reference character 44. It comprises a wooden bar 45 having upper and lower crushing strips 46 and 47 respectively on its opposite faces.

On opposite sides of the rounded crown portion 48 are toothed saws 49. The inner or upper end portions of these devices 44 are enclosed within the metal housing with the toothed saws arranged to come into close proximity with the crushing plates 21 as seen in Fig. 3. The lower ends of the devices are beveled off as indicated at 50 in this figure, these serving to come into sliding contact with the ground to avoid hanging, and obstruction in the movement of the device.

It will be observed from Fig. 3, that the rear end of the housing is open and arranged to discharge into a collection trough 51. This trough is of appropriate configuration as shown in Figs. 3 and 4. The cotton which is dumped into it, is sucked into the aforesaid fan 35, by way of a connecting neck 52 at one end of the trough as seen in Fig. 4.

Considering Fig. 4 further, it will be observed that on the remote end of the aforesaid shaft 26 is a sprocket with which a chain 53 cooperates. This chain also drives a sprocket on a stub shaft 54, the latter shaft extending into a separate fan casing or housing 55, which is provided with a suction fan (not shown).

The reference character 56 designates a discharge or outlet for this casing 55. Incidentally this fan is adapted for sucking the hulls into it and then discharge them through the outlet 56. A flexible tube connection 57 is therefore provided, and this joined to a suitably shaped manifold 58 which has communication with the bottom of the housing as shown in Fig. 3.

In operation, it is understood that the wheel supported frame straddles the row of cotton plants and is drawn along the row in any suitable manner. As it is thus propelled, the reciprocatory and rotating devices 44 are simultaneously actuated in an intermittent fashion, causing the toothed saw members to engage the stem of the plant. This permits the bolls and cotton to be severed from the stem by a clinging and drawing action. In fact, there is an uplifting action of the plant causing the bolls to hang on the teeth of the saw bars or devices 44. This alternating reciprocatory action of these devices not only severs the cotton, but feeds it in a step by step manner up along the toothed edges into the housing, where the hulls are crushed against the adjustable top plates 20 and separated.

The hulls are drawn into the manifold 58 and discharged through the outlet 6 whereas the cotton is dumped into the trough 51 and then sucked into the collecting box 10.

From the foregoing description and drawings it will be seen that I have evolved a novel straddle row machine equipped with mechanical mechanism for simultaneously severing the cotton from the plants and then hauling it inwardly into a housing where it is acted upon by crushing means to separate the hulls from the cotton and to then divide the hulls from the cotton, carrying the hulls in one direction and discharging them onto the ground, and carrying the cotton from a trough into a collection box from which it is periodically removed.

In conclusion I wish to invite attention to the fact that the tooth equipped bars substantially are self cleaning and prevent accumulation and hanging of cotton on the teeth. This is because of the uplifting action of the respective bars. Moreover, the longitudinal strips on the sides of the bars serve for additionally crushing the hulls which drop between the bars due to this rubbing and relatively rotatable action caused by the rotating crank shafts.

Having thus described my invention, what I claim as new is:—

1. In a structure of the class described, a wheel supported frame, a collection trough on said frame, a housing adjustably and rockably mounted on said frame and open at its inner end and discharging into said trough, a pair of crank shafts mounted for rotation in said housing, a plurality of spaced parallel tooth equipped picking and gathering bars carried by said crank shafts, and having their inner and upper end portions movable longitudinally and rotatably in said housing.

2. In a structure of the class described, a wheel supported frame, a collection trough on said frame, a housing adjustably and rockably mounted on said frame and open at its inner end and discharging into said trough, a pair of crank shafts mounted for rotation in said housing, a plurality of spaced parallel tooth equipped picking and gathering bars carried by said crank shafts, and having their inner and upper end portions movable longitudinally and rotatably in said housing, said housing including an adjustable top plate functioning as a crushing plate.

3. In a structure of the class described, a wheel supported frame, a collection trough on said frame, a housing adjustably and rockably mounted on said frame and open at its inner end and discharging into said trough, a pair of crank shafts mounted for rotation in said housing, a plurality of spaced parallel tooth equipped picking and gathering bars carried by said crank shafts and having their inner and upper end portions movable longitudinally and rotatably in said housing, said housing includng an adjustable top plate functioning as a crushing plate, together with a hull accumulating manifold, and suction fans separably connected with said trough and the manifold, for the purposes specified.

4. In a structure of the class described, a picking and gathering mechanism for use in association with a machine of the class described comprising a housing including a bottom plate, side walls, and an adjustable cover and crushing plate between said side walls, a pair of longitudinally spaced crank shafts in said housing, a plurality of spaced parallel intermittently operable tooth equipped picking and gathering bars carried by the crank portions of said shaft having their inner end portions located in said housing, the outer end portions arranged for engagement with the stems of the plants.

In testimony whereof I affix my signature.

MARK L. OSBORN.